United States Patent [19]

White, Jr.

[11] 3,747,376

[45] July 24, 1973

[54] BAR LOCK LINKAGE

[76] Inventor: James Carlton White, Jr., 328 Union St., South Weymouth, Mass. 02190

[22] Filed: Aug. 23, 1971

[21] Appl. No.: 173,812

[52] U.S. Cl. ................... 70/18, 24/241 R, 59/91, 70/58, 70/233
[51] Int. Cl. ................... E05b 73/00, E05b 71/00
[58] Field of Search ............ 24/16 R, 232, 241 SL, 24/241 R, 248, 249; 33/105, 106; 59/78, 90, 91; 70/14, 15, 18, 30, 49, 233, 234, 58; 211/4, 5; 74/248, 249

[56] References Cited
UNITED STATES PATENTS

| 639,196 | 12/1899 | Fehling | 70/49 |
| 124,222 | 3/1872 | Scott et al. | 33/105 |
| 958,706 | 5/1910 | Chambless | 70/18 X |
| 2,315,941 | 4/1943 | D'Amato | 33/106 |
| 2,451,100 | 10/1948 | Lecompte | 70/49 UX |

FOREIGN PATENTS OR APPLICATIONS

| 335,862 | 4/1921 | Germany | 70/18 |
| 9,598 | 10/1902 | Germany | 70/49 |
| 385,272 | 11/1923 | Germany | 70/18 |

*Primary Examiner*—Marvin A. Champion
*Assistant Examiner*—Lawrence J. Staab
*Attorney*—William C. Roch

[57] ABSTRACT

A linkage for securing a motorcycle to a fixture such as a telephone pole to prevent the theft of the motorcycle. The linkage consists of a bar lock having a plurality of bar links which are pivotally fastened together end to end by rivots. The bar lock has two free ends which may be fastened together by a barrel lock. Each bar link consists of a length of steel bar, and the bar links pivot relative to one another at the rivoted connections so that the bar lock may be folded together into a compact package for storage on the motorcycle while the bike is being used.

2 Claims, 2 Drawing Figures

BAR LOCK LINKAGE

BACKGROUND OF THE INVENTION

The present invention relates generally to an antitheft device for a movable and valuable object such as a motorcycle, and more particularly pertains to a new and improved locking mechanism for the movable object.

In the field of antitheft mechanisms for motorcycles one known technique for preventing the theft of the bike has been to secure it to an immovable fixture such as a pole by a locked chain or a pair of criminal handcuffs. This technique has been unsatisfactory as it is relatively easy for a thief to cut most chains or handcuffs with a commercial boltcutter.

A known variation of this prior art technique is to use a large diameter, flexible, ball-jointed steel bar to secure the motorcycle to the pole. This approach has been unsatisfactory as the cost is quite high for the necessary length of flexible steel bar. Further, it is relatively inconvenient to store such a flexible steel bar while the bike is in use.

Other known systems to prevent thefts of motorcycles involve the use of electronic devices which sound an alarm when an unauthorized person tampers with the bike. These systems are unsatisfactory as they do not physically restrain the motorcycle, and also they are quite expensive.

SUMMARY OF THE INVENTION

In accordance with a preferred embodiment, a bar lock linkage is disclosed for preventing the theft of unauthorized taking of a movable and valuable object. The preferred embodiment has particular utilization with portable vehicles such as motorcycles although it may be beneficially usable with portable power tools, boats or any portable and valuable object. Further, the preferred embodiment provides a bar lock linkage which may be utilized to secure a motorcycle to an immovable object such as a telephone pole, and which may be conveniently folded for storage while the bike is being used. A small case strapped to the bike might be utilized to store the folded, bar lock linkage illustrated by the preferred embodiment. Also, the preferred embodiment provides a bar lock linkage which may not be easily severed by a boltcutter. Further, the preferred embodiment provides a bar lock linkage which is relatively inexpensive and easy to construct from commercially available materials.

DESCRIPTION OF A PREFERRED EMBODIMENT

Figure 1:
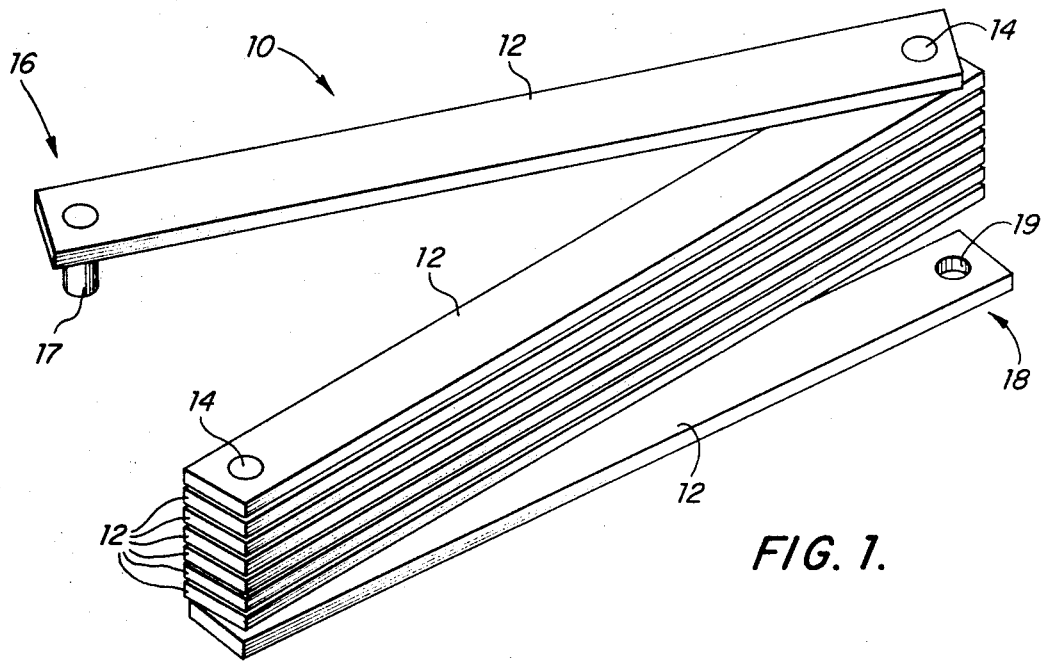
FIG. 1 illustrates a preferred embodiment of a partially folded bar lock linkage.

FIG. 1 illustrates a preferred embodiment of a partially folded bar lock linkage. The bar lock linkage 10 consists of a plurality of bars 12 which are fastened together end to end by rivets 14. The rivets 14 are preferably heavy duty rivets which do not leave a protruding end which might be easily cut by a tool such as a boltcutter. The rivets provide a plurality of pivotable connections such that the bar lock linkage may be folded up completely or extended to its full length. One free end 17 of the bar lock linkage has a fastening means in the form of a stud 17 welded thereto, and the other free end 18 has a fastening means in the form of a hole 19 formed therein. With this arrangement the free ends may be locked together by inserting the stud 17 into hole 19, screwing a nut onto the stud, and securing the nut against unauthorized removal with a barrel lock. A barrel lock is a commercially available lock which, when secured over a nut, prevents the nut from being unscrewed until the barrel lock is removed. Other types of fastening arrangements and other types of locks such as turret locks might also be used to secure the free ends of the bar lock linkage together. The bar with the stud is preferably slightly longer than the remaining bars so that the bar lock linkage may be completely folded with the stud protruding beyond the end of the folded linkage.

In one embodiment, a bar lock linkage was constructed of eight bars of a length of 7½ inches, a thickness of three sixteenths of an inch, and a width of three quarters of an inch, and a ninth bar having a length of 8½ inches, and the same thickness and width as the other eight bars. The bars were constructed from commercially available cold rolled steel bar. The rivets utilized to fasten the bars together were chosen to withstand at least a one thousand pound force of tension. The ninth and longer bar was provided so that when the bar lock linkage is completely folded the overlapping length of the ninth bar provides a convenient place to store the barrel lock.

Figure 2:
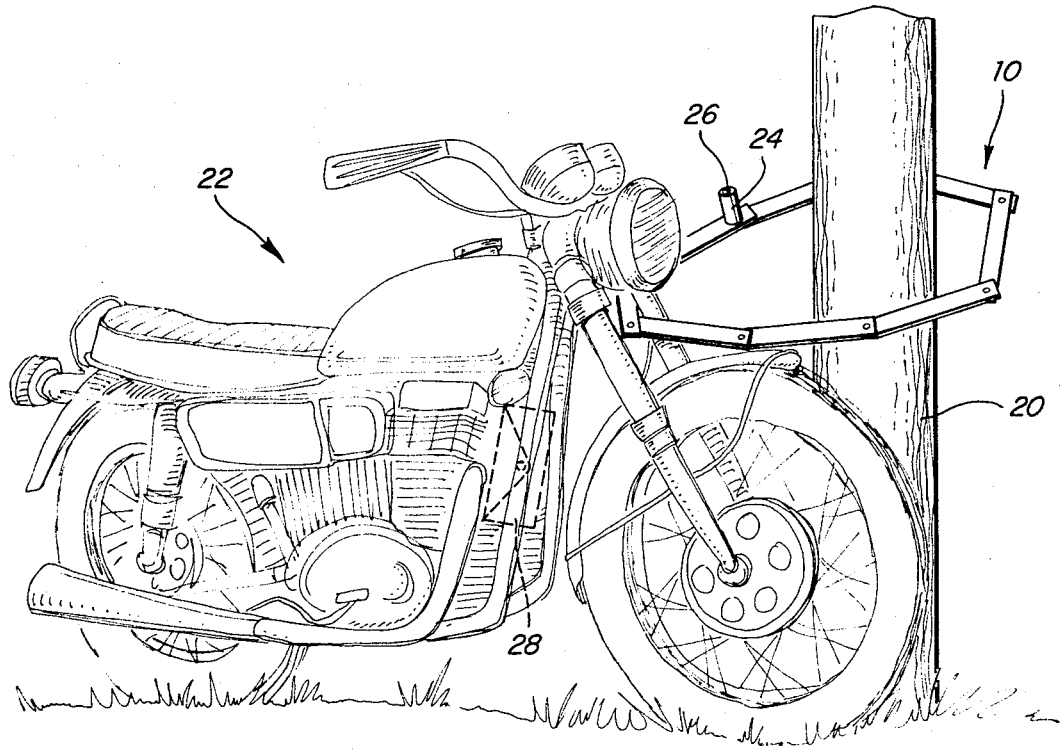
FIG. 2 shows the linkage of FIG. 1 being used to secure a motorcycle to a telephone pole.

FIG. 2 illustrates the linkage of FIG. 1 being used to secure a motorcycle to a telephone pole. The linkage 10 has been wrapped around the telephone pole 20 and inserted through the frame of the motorcycle 22. The two free ends of the bar lock linkage 10 are secured together by a barrel lock 24 having a key hole 26. As shown in dotted lines in FIG. 2 is a case 28 which may be strapped to the motorcycle frame for convenient storage of the bar lock linkage and lock while the bike is being used.

While several embodiments have been described, the teachings of this invention will suggest many other embodiments to those skilled in the art. While one set of dimensions for a bar lock linkage have been given, other bar lock linkages might be constructed with different dimensions. Further, although one embodiment has been described wherein the bars are constructed of commercially available cold rolled steel bar, other materials might be used instead. For instance, stainless steel immediately suggests itself as an alternative construction material. Also, other types of locks besides turret and barrel locks could be used to connect the free ends of the bar lock linkage.

I claim:

1. A bar lock linkage for securing a movable object to a secure fixture and which linkage is not easily severed by portable tools and comprising:

a. a plurality of elongated bars connected end to end to form a bar linkage with two open ends, each said bar having a relatively thin thickness dimension, a width dimension which is several times as large as said thickness dimension, and a length dimension which is several times as large as said width dimension, said plurality of bars consisting of a number of bars of equal length and one end bar of a longer length positioned at one end of said bar linkage such that said longer length bar forms one of said open ends of said bar linkage;

b. means for fastening the end of each bar to the end of an adjacent bar, except for the bar ends at said two open ends, with a pivotal connection which is substantially centrally located with respect to the width of each bar to allow the bar linkage to be folded together to form a folded assembly having a maximum length substantially equal to the length of said longer length bar, a width dimension, taken along the same direction as the width dimension of each bar, which is substantially equal to the width of each bar, and a thickness dimension, taken along the same direction as the thickness dimension of each bar, which is substantially equal to the total of the thicknesses of all the bars and whatever additional thickness is added by said fastening means; and c. locking means for allowing said two open ends of said bar linkage to be locked together to form a closed, locked linkage which may not be opened by unauthorized persons, said locking means being fastened to said open end of said longer length bar and extending along said thickness dimension of said folded assembly such that the position of said locking means allows said locking means to be stored conveniently with said folded assembly in a package no larger in length, width and thickness than said maximum length, said width and said thickness of said folded assembly.

2. A bar lock linkage as set forth in claim 1 wherein said locking means includes a barrel lock.

* * * * *